(12) United States Patent
Lamberti et al.

(10) Patent No.: US 11,589,196 B2
(45) Date of Patent: Feb. 21, 2023

(54) GAS TURBINE ENGINE COMMUNICATION SYSTEM AND METHOD

(71) Applicant: Raytheon Technologies Corporation, Farmington, CT (US)

(72) Inventors: William C. Lamberti, Narragansett, RI (US); Jason E. Posniak, Broad Brook, CT (US); Arun Srinivasan, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 69 days.

(21) Appl. No.: 17/168,371

(22) Filed: Feb. 5, 2021

(65) Prior Publication Data

US 2022/0256319 A1    Aug. 11, 2022

(51) Int. Cl.
*H04W 4/38* (2018.01)
*H04W 4/44* (2018.01)
*H04W 76/30* (2018.01)
*H01Q 1/28* (2006.01)

(52) U.S. Cl.
CPC .............. *H04W 4/38* (2018.02); *H01Q 1/28* (2013.01); *H04W 4/44* (2018.02); *H04W 76/30* (2018.02)

(58) Field of Classification Search
CPC ......... H04W 4/38; H04W 4/44; H04W 76/30; H01Q 1/28; B60K 6/445
See application file for complete search history.

(56) References Cited

U.S. PATENT DOCUMENTS

| | | | |
|---|---|---|---|
| 8,856,523 B2 | 10/2014 | Leclercq | |
| 9,152,146 B2 | 10/2015 | Ziarno | |
| 9,576,404 B2 | 2/2017 | Ziarno | |
| 10,035,609 B2 | 7/2018 | Ziarno | |
| 11,193,387 B2 * | 12/2021 | Yardibi | ................ F01D 21/003 |
| 2015/0316926 A1 * | 11/2015 | Ziarno | ............... G05B 23/0213 |
| | | | 701/3 |
| 2020/0334925 A1 | 10/2020 | Scheid | |
| 2020/0362766 A1 | 11/2020 | Lamberti | |
| 2020/0378271 A1 | 12/2020 | Lamberti | |
| 2022/0135244 A1 * | 5/2022 | Lee | ...................... G07C 5/0841 |
| | | | 340/945 |

OTHER PUBLICATIONS

EP search report for EP22155275.5 dated Jun. 15, 2022.

* cited by examiner

*Primary Examiner* — Chandrahas B Patel
(74) *Attorney, Agent, or Firm* — Getz Balich LLC (57) ABSTRACT

A communication system of a gas turbine engine for an aircraft includes an engine control system configured to generate engine data and a communication device. The communication device includes a memory system and a communication interface configured to wirelessly communicate with an offboard system external to the aircraft and to communicate with the engine control system and the memory system. The communication interface is further configured to receive the generated engine data from the engine control system. The communication device further includes processing circuitry configured to selectively record the generated engine data, determine a location of the gas turbine engine, determine a data management strategy based on the determined location, and transmit, using the communication interface, a first portion of the recorded engine data to the offboard system. A data content of the first portion of the recorded engine data is based on the data management strategy.

18 Claims, 5 Drawing Sheets

GAS TURBINE ENGINE COMMUNICATION SYSTEM AND METHOD

BACKGROUND

1. Technical Field

This disclosure relates generally to gas turbine engine communication systems, and more particularly to communications data security compliance.

2. Background Information

Contemporary gas turbine engines, such as gas turbine engines for aircraft, may generate large quantities of engine data during operation. In some cases, it may be necessary or desirable to transmit portions of the engine data to offboard communications systems for remote monitoring of the gas turbine engine. With the proliferation of regulations governing data localization and data security, strict compliance with local regulations may be cumbersome, as requirements for data residency and the use of encryption technologies are not uniform throughout the world. Accordingly, what is need are improved systems and methods for controlling data communications between "connected" gas turbine engines and offboard communications systems.

SUMMARY

It should be understood that any or all of the features or embodiments described herein can be used or combined in any combination with each and every other feature or embodiment described herein unless expressly noted otherwise.

According to an aspect of the present disclosure, a communication system of a gas turbine engine for an aircraft includes an engine control system configured to generate engine data and a communication device. The communication device includes a memory system configured to store the generated engine data from the engine control system and a communication interface configured to wirelessly communicate with an offboard system external to the aircraft and to communicate with the engine control system and the memory system. The communication interface is further configured to receive the generated engine data from the engine control system. The communication device further includes processing circuitry configured to selectively record the generated engine data received by the communication interface to the memory system, determine a location of the gas turbine engine, determine a data management strategy based on the determined location, and transmit, using the communication interface, a first portion of the recorded engine data to the offboard system. A data content of the first portion of the recorded engine data is based on the data management strategy.

In any of the aspects or embodiments described above and herein, the processing circuitry is configured to receive at least one of a GPS location, a cellular location, or a city pair location to determine the location of the gas turbine engine.

In any of the aspects or embodiments described above and herein, the processing circuitry is configured to selectively record a portion of the generated engine data based on the data management strategy.

In any of the aspects or embodiments described above and herein, the data management strategy includes an encryption strategy, and the processing circuitry is configured to encrypt the first portion of the recorded engine data with a first encryption rule of the encryption strategy.

In any of the aspects or embodiments described above and herein, the processing circuitry is configured to selectively record the generated engine data to the memory system as a first data stream, including the first portion of the recorded engine data, and a second data stream which is different than the first data stream and wherein a data stream content of the first data stream and the second data stream is based on the data management strategy.

In any of the aspects or embodiments described above and herein, the processing circuitry is configured to encrypt recorded engine data of the first data stream with the first encryption rule of the encryption strategy and to encrypt recorded engine data of the second data stream with a second encryption rule of the encryption strategy, which is different than the first encryption rule.

In any of the aspects or embodiments described above and herein, the offboard system includes a plurality of ground stations and the processing circuitry is configured to direct the communication interface to transmit the first portion of the recorded engine data to a particular ground station of the plurality of ground stations based on the data management strategy.

In any of the aspects or embodiments described above and herein, the processing circuitry is configured to direct the communication interface to receive an updated data management strategy, associated with the determined location, from the offboard system and to direct the communication interface to transmit a second portion of the recorded engine data to the offboard system. A second data content of the second portion of the recorded engine data is based on the updated data management strategy.

In any of the aspects or embodiments described above and herein, the processing circuitry is configured to disable transmission of the recorded engine data to the offboard system by the communication interface based on the data management strategy.

In any of the aspects or embodiments described above and herein, the engine control system includes a plurality of sensors configured to capture state data associated with the gas turbine engine and the engine data includes the state data.

According to another aspect of the present disclosure, a method for controlling communications between a gas turbine engine for an aircraft and an offboard system includes generating engine data with an engine control system, selectively recording the generated engine data, determining a location of the gas turbine engine, determining a data management strategy based on the determined location, and transmitting a first portion of the recorded engine data to the offboard system. A data content of the first portion of the recorded engine data is based on the data management strategy.

In any of the aspects or embodiments described above and herein, receiving the location of the gas turbine engine includes determining at least one of a GPS location, a cellular location, or a city pair location.

In any of the aspects or embodiments described above and herein, selectively recording the generated engine data includes selectively recording a portion of the generated engine data based on the data management strategy.

In any of the aspects or embodiments described above and herein, the data management strategy includes an encryption strategy. The method further includes encrypting the first portion of the recorded engine data with a first encryption rule of the encryption strategy.

In any of the aspects or embodiments described above and herein, selectively recording the generated engine data includes selectively recording the generated engine data as a first data stream, including the first portion of the recorded engine data, and a second data stream different than the first data stream and a data stream content of the first data stream and the second data stream is based on the data management strategy.

In any of the aspects or embodiments described above and herein, encrypting the recorded engine data further includes encrypting recorded engine data of the first data stream with the first encryption rule of the encryption strategy and encrypting recorded engine data of the second data stream with a second encryption rule of the encryption strategy which is different than the first encryption rule.

In any of the aspects or embodiments described above and herein, the offboard system includes a plurality of ground stations and transmitting the first portion of the recorded engine data to the offboard system includes transmitting the first portion of the recorded engine data to a particular ground station of the plurality of ground stations based on the data management strategy.

In any of the aspects or embodiments described above and herein, the method further includes receiving an updated data management strategy, associated with the determined location, from the offboard system.

In any of the aspects or embodiments described above and herein, the method further includes disabling transmission of the recorded engine data to the offboard system based on the data management strategy.

According to another aspect of the present disclosure, a gas turbine engine for an aircraft includes an engine control system configured to generate engine data. The engine control system includes a plurality of sensors configured to capture state data associated with the gas turbine engine. The gas turbine engine further includes a communication device including a memory system configured to store the generated engine data from the engine control system and a communication interface configured to wirelessly communicate with an offboard system external to the aircraft and to communication with the engine control system and the memory system. The communication interface further configured to receive the generated engine data from the engine control system. The communication device further includes processing circuitry configured to selectively record the generated engine data received by the communication interface to the memory system, determine a location of the gas turbine engine, determine a data management strategy based on the determined location, and direct the communication interface to transmit a first portion of the recorded engine data to the offboard system. A data content of the first portion of the recorded engine data is based on the data management strategy.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
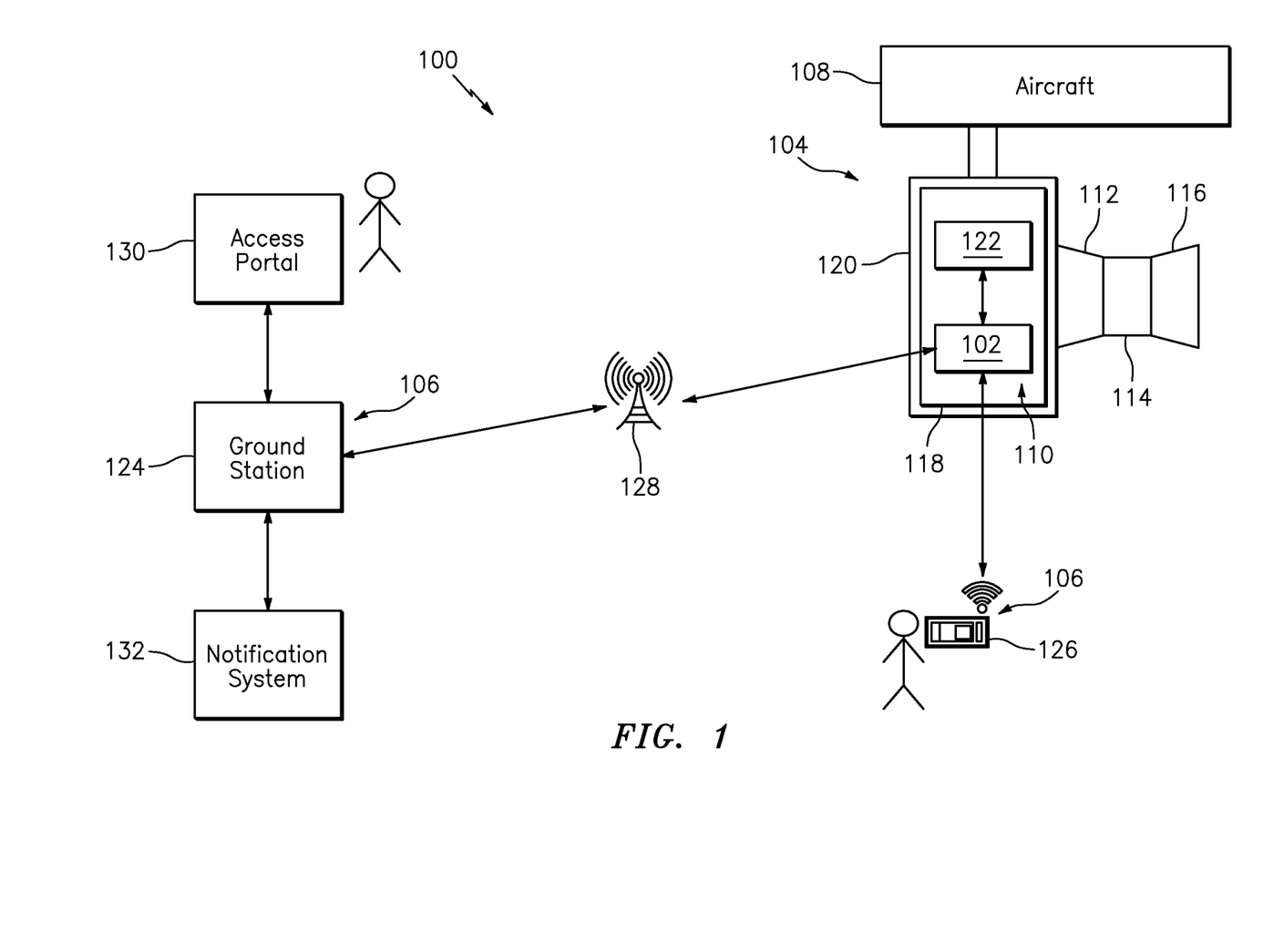
FIG. 1 illustrates a block diagram of a system supporting wireless communication between an engine and offboard systems, in accordance with one or more embodiments of the present disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and communication into the combustor section 114 then expansion through the turbine section 116. A fan case 118 of the fan section 110 can be covered by a cowling 120 and may provide an installation surface that is cooler than other sections 112-116 of the gas turbine engine 104.

An engine control system 122 can be mounted on the fan case 118 and covered by the cowling 120. The engine control system 122 is configured to monitor and control operation of the gas turbine engine 104 in real-time. In order to transfer configuration items, such as programs and data to and from the engine control system 122, contemporary systems typically require that the cowling 120 is opened and multiple cables of bundled wires are coupled to the engine control system 122. Such a process can ensure deliberate actions are taken in extracting data and performing updates to the engine control system 122; however, the process can be slow and require large lengths of customized cables. In various embodiments, the communication adapter 102, also referred to as a gas turbine engine communication gateway, is configured to establish communication with the engine control system 122 and wireless communication with one or more offboard systems 106 external to the aircraft 108. Similar to the engine control system 122, the communication adapter 102 can be mounted on the fan case 118 and covered by the cowling 120 of the gas turbine engine 104. Wireless communication can alleviate the need for customized cables or physically opening the cowling 120 to establish communication with the offboard systems 106. In various embodiments, the communication adapter 102 may be integral with the engine control system 122, while in other embodiments the communication adapter 102 may be an independent electronic system external to the engine control system 122.

The offboard systems 106 can include, for example, one or more ground stations 124, a near-wing maintenance computer 126, an access portal 130, and/or other devices that may establish one-way or two-way wireless communication with the communication adapter 102. For example, a global positioning system (GPS) can provide one-way wireless signaling to the communication adapter 102 to assist in confirming a geographic location of the gas turbine engine 104 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. The wireless communication configuration of the communication adapter 102 may permit the communication adapter 102 to receive or otherwise determine a location (e.g., a geographical location) of the gas turbine engine 104 based on at least one of a GPS location, a cellular location, and/or a city pair location (e.g., a location based on known aircraft city pairs). In various embodiments, the communication adapter 102 may be configured to receive location data from one or more sources internal or external to the aircraft 108. For example, the communication adapter 102 may receive a location data signal from one or more electronic systems of the aircraft 108 flight deck or by interception of an external broadcast (e.g., an Automated Dependent Surveillance Broadcast ("ADS-B")). In various embodiments, for example, the communication adapter 102 may determine a location based on multiple location data sources (e.g., GPS location, cellular location, and city pair location), thereby allowing validation of the gas turbine engine 104 location based on the multiple location data inputs. Accordingly, communication adapter 102 may accurately determine a location of the gas turbine engine 104 despite spurious location data or loss of a location signal from one or more location data sources. Additionally, the ability to handle multiple types of location data inputs allows the communication adapter 102 to be used on different aircraft having different location data sources and equipment. Wireless communication between the communication adapter 102 and the offboard systems 106 can be direct or indirect. For instance, wireless communication between the communication adapter 102 and the one or more ground station 124 may pass through one or more network interface components 128, such as a repeater, while wireless communication between the communication adapter 102 and the near-wing maintenance computer 126 may be direct wireless communication without any relay components.

The ground station 124 can provide communication with a variety of support systems, such as an access portal 130 that provides authorized users to access data, initiate tests, configure software, and perform other actions with respect to the engine control system 122, where the communication adapter 102 acts as a secure gateway to limit access and interactions with the engine control system 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the communication adapter 102 for fault data, test parameters, and other such information. In various embodiments, the near-wing maintenance computer 126 can be authorized with limited authority to make updates to select configuration parameters or data collection parameters of the communication adapter 102.

Figure 2:
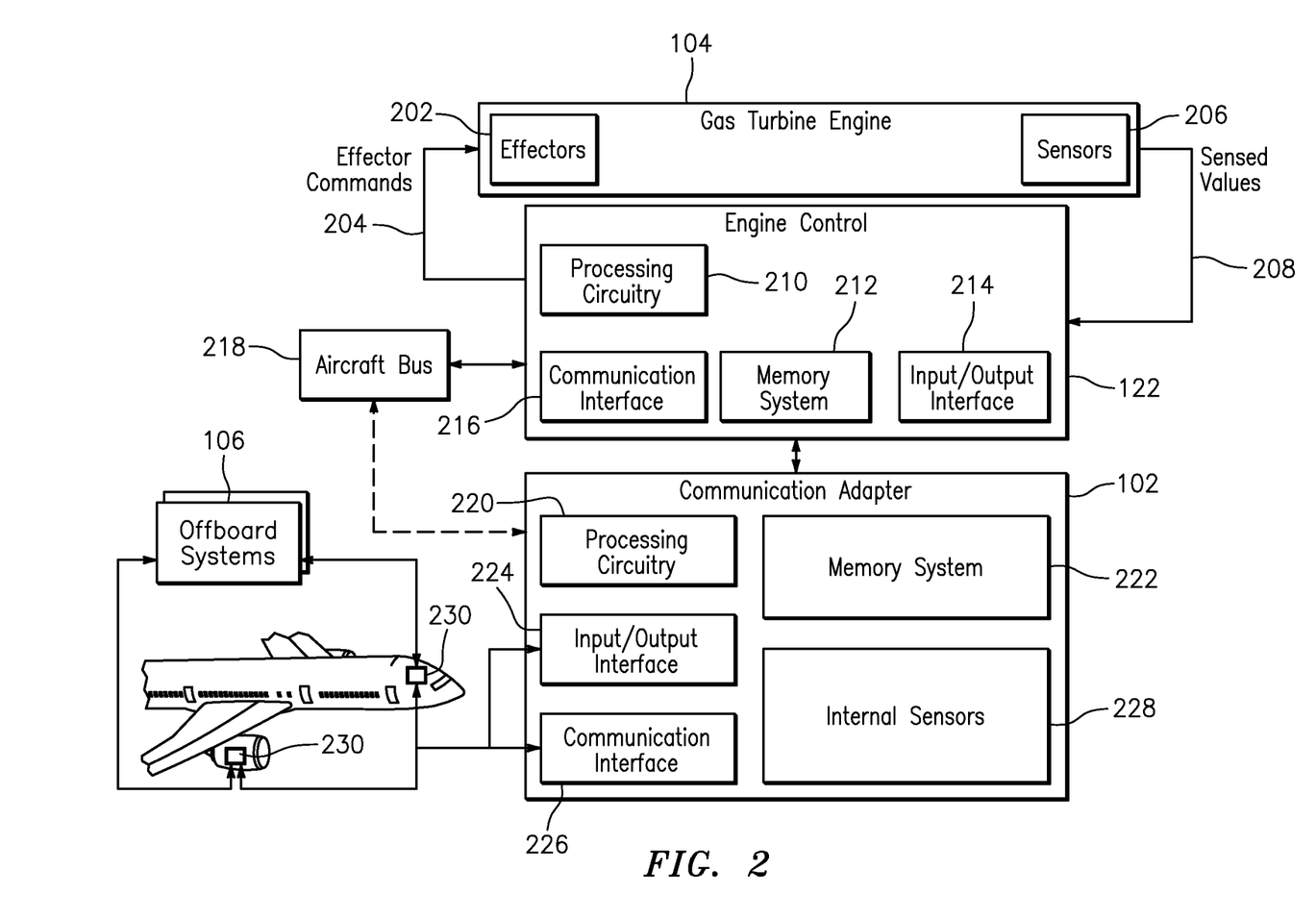
FIG. 2 illustrates a block diagram including further details of the system of FIG. 1, in accordance with one or more embodiments of the present disclosure.
Figure 3A:
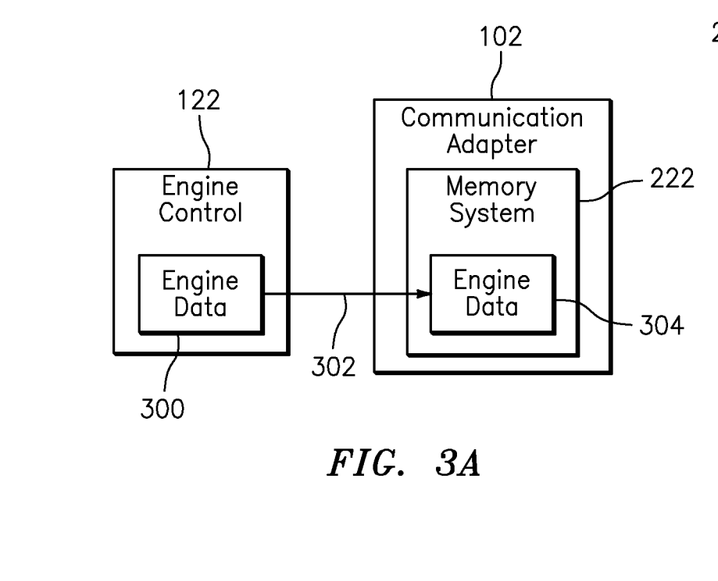
FIGS. 3A-D illustrate block diagrams including further details of the system of FIG. 2, in accordance with one or more embodiments of the present disclosure.
Figure 3B:
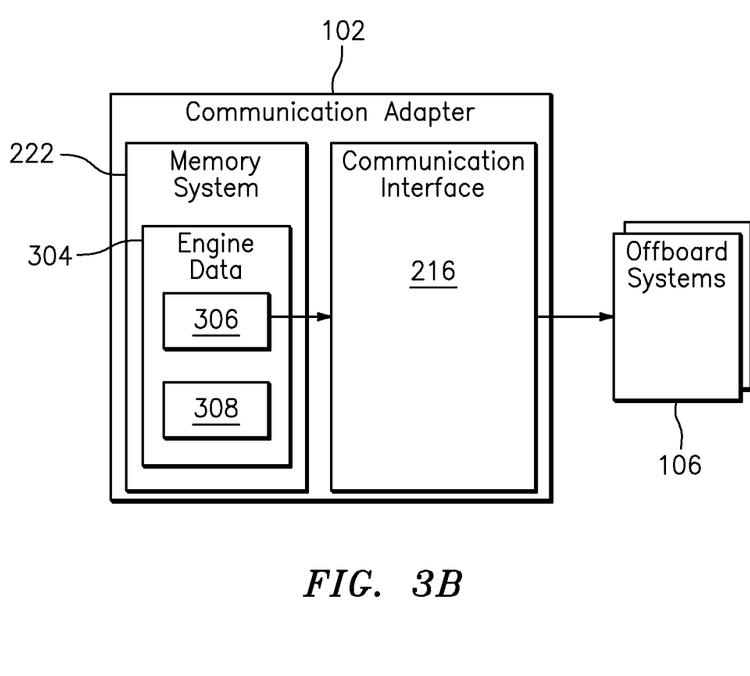
Figure 3C:
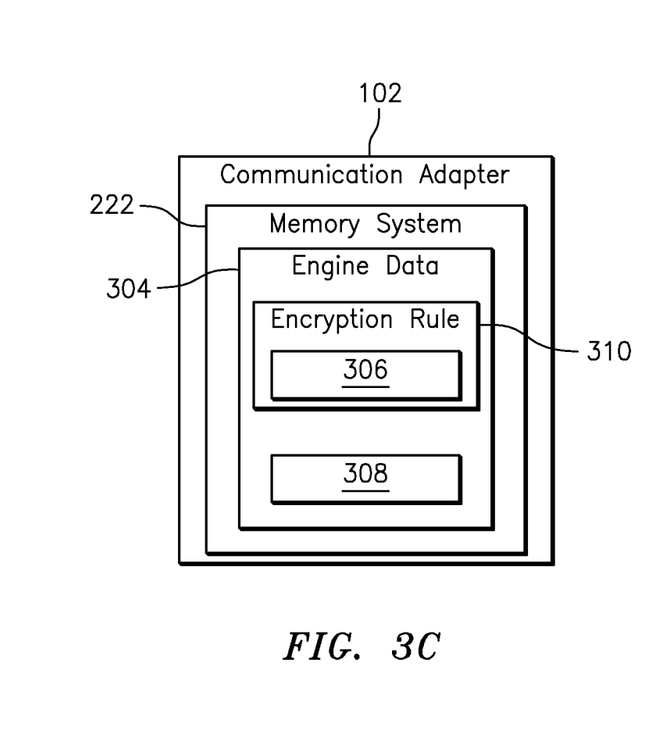
Figure 3D:
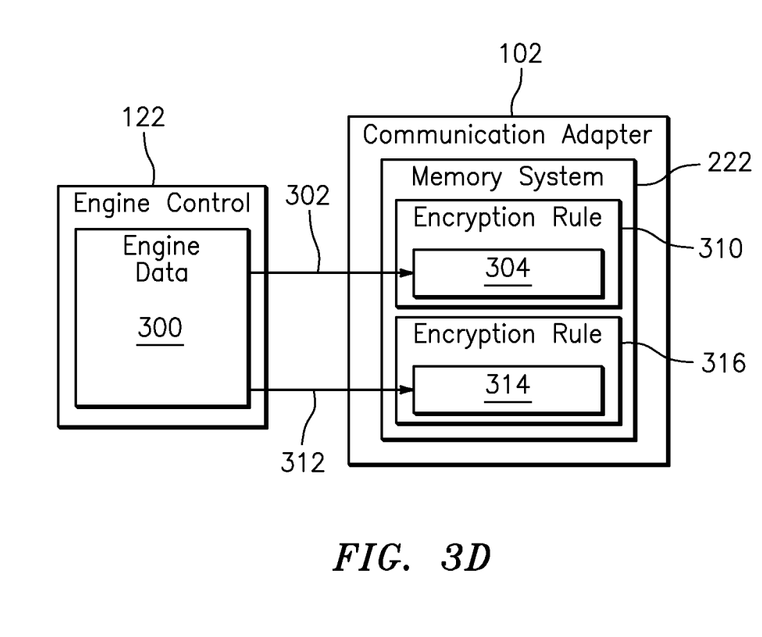

FIG. 2 is a block diagram illustrating further details of the system 100 of FIG. 1, in accordance with one or more embodiments of the present disclosure. The engine control system 122 can control effectors 202 of the gas turbine engine 104 by generating one or more effector commands 204. Examples of effectors 202 can include one or more motors, solenoids, valves, relays, pumps, heaters, and/or other such actuation control components. The engine control system 122 can generate engine data associated with the configuration, operation, status, and/or other aspects of the gas turbine engine 104. In various embodiments, the engine data may additionally include data associated with the aircraft 108. The engine control system 122 may include a plurality of sensors 206 which can capture state data associated with the gas turbine engine 104 and provide sensed values 208 as feedback to the engine control system 122 to provide closed-loop control of the gas turbine engine 104 according to one or more control laws. The engine data generated by the engine control system 122 may include the state data captured by the plurality of sensors 206. Examples of the sensors 206 can include one or more temperature sensors, pressure sensors, strain gauges, speed sensors, accelerometers, lube sensors, and the like.

The engine control system 122 can be a full authority digital engine control system that includes processing circuitry 210 and a memory system 212 configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in various embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control system 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control system 122 to control the gas turbine engine 104 in real-time.

Similar to the engine control system 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in various embodiments, the memory system 222 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form. The communication adapter 102 can also include a plurality of internal sensors 228. The internal sensors 228 can be, for example, one or more accelerometers, gyroscopes, barometers, a compass, a GPS, and other such sensors. The input/output interface 224 can process data collected from the internal sensors 228 and condition the data in a format usable by the processing circuitry 220. The communication interface 226 can interface with one or more antennas 230, which may be integrated with the communication adapter 102 or located remotely from the communication adapter 102, e.g., a sharkfin antenna mounted under or on the cowling 120 of FIG. 1.

The communication adapter 102 can act as a secure communication gateway with respect to the offboard systems 106. For example, the offboard systems 106 can request to load new/updated configuration items to the memory system 212 of the engine control system 122 through the communication adapter 102. The communication interface 216 of the engine control system 122 can interface to the communication interface 226 of the communication adapter 102 through a wired, optical, or magnetic coupling. The communication interface 226 can communicate wirelessly through antennas 230 to the offboard systems 106. For example, the communication interface 226 of the communication adapter 102 can transmit data, such as engine data, stored in memory system 212 and/or memory system 222 to the offboard systems 106. The communication interface 226 may also have access to receive data directly from the aircraft bus 218, the memory system 212, and/or the memory system 222 in various embodiments. In various embodiments, the communication adapter 102 may be configured to send a request to the engine control system 122 to provide aircraft parameters received via the aircraft bus 218 and/or engine parameters computed by the engine control system 122 while in other embodiments the communication adapter 102 may be configured to passively monitor aircraft parameters, engine parameters, and other data output from aircraft systems such as the aircraft bus 218 and/or the engine control system 122.

The communication adapter 102 can manage credentials and user authentication to limit access of the memory system 212 of the engine control system 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212.

Configuration items received for the engine control system 122 and/or the communication adapter 102 may be encrypted using various cryptographic methods to further enhance security. For example, the communication adapter 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication adapter 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control system 122 upon authentication.

Separating the communication adapter 102 from the engine control system 122 can provide the communication adapter 102 and the engine control system 122 to have different expected service life durations. For example, to stay compatible with changes in wireless communication technologies used by the offboard systems 106, the communication adapter 102 may be upgraded at a faster interval than the engine control system 122. The communication adapter 102 can have a lower processing and storage capacity than the engine control system 122 to reduce power requirements, weight, and other costs associated with the communication adapter 102. Since the communication adapter 102 does not actively control the gas turbine engine 104, development cycles may be reduced as compared to implementing flight critical control algorithms and hardware of the engine control system 122.

FIGS. 3A-D show simplified block diagrams illustrating further exemplary details of the relationship between the engine control system 122, the communication adapter 102, and the offboard systems 106 of FIG. 2, in accordance with one or more embodiments of the present disclosure. Referring to FIGS. 2 and 3A-D, the engine control system 122 can provide engine data 300 to the communication adapter 102 in the form of a data stream 302. The engine data 300 can be provided to the communication adapter from the memory system 212, directly from the plurality of sensors 206, and/or from one or more other electronic components of the engine control system 122, the gas turbine engine 104, and/or the aircraft 108. The memory system 222 of the communication adapter 102 may be configured to selectively record the engine data 300 (e.g., as recorded engine data 304) from the engine control system 122. In various embodiments, the memory system 212 of the engine control system 122 may additionally or alternatively be configured to selectively record the engine data 300.

As previously discussed, the communication adapter 102 may be configured with one or more electronic systems (e.g., GPS systems, wireless communication systems, etc.) which may be used by the processing circuitry 210 to determine a location of the gas turbine engine 104. Because regulations governing engine data localization and security may vary by location, country, region, etc., aircraft operators may need to be capable of quickly and accurately tailoring data communication strategies for compliance with local regulations when using in-country infrastructure (e.g., offboard systems 106) to transmit engine data. Accordingly, the processing circuitry 210 may be configured to determine an appropriate data management strategy which is unique to the determined location of the gas turbine engine 104.

The geofencing capability of the communication adapter 102 may provide for the communication adapter 102 to trigger a unique communication response when the gas turbine engine 104 enters or leaves a particular area (e.g., geographical area, country, etc.). For example, a plurality of data management strategies (e.g., profiles) corresponding to a respective plurality of locations (geographical, national, etc.) may be stored in the memory system 222 of the communication adapter 102 for selective retrieval by the processing circuitry 210 based on the determined location of the gas turbine engine 104. Data management strategies may be centrally managed (e.g., using a computer server, cloud-based computing platform, etc.) and may be periodically uploaded to the communication adapter 102 from, for example, the offboard systems 106 or any other suitable communication system. As used herein, the term "unique" with respect to a data management strategy means that the particular data management strategy is specific to the determined location. In other words, data sharing and encryption rules of the data management strategy for a particular location (e.g., country) are based on regulations and other data compliance considerations associated with that particular location. However, it should be understood that a data management strategy which is "unique" to one location may be similar or the same as a second data management strategy which is unique to a second different location.

Based on the unique data management strategy for the determined location, the processing circuitry 210 may be configured to direct the communication interface 226 to transmit a first portion 306 of the recorded engine data 304 to the offboard system 106. The data content of the first portion 306 of the recorded engine data 304 may be selected based on the data management strategy for the determined location in order to comply with local data communication and security regulations. In various embodiments, a second portion 308 of the recorded engine data 304 may not be transmitted to the offboard system 106 and may continue to be stored by the memory system 222 or discarded. In various embodiments, all of the recorded engine data 304 may be transmitted to the offboard system 106. In various embodiments, the processing circuitry 210 may be configured to direct the memory system 222 to selectively record a portion of the generated engine data 300 from the engine control system 122. The portion of the generated engine data 300 to be selectively recorded may be based on the data management strategy for the determined location. In various embodiments, the processing circuitry 210 may be configured to disable transmission of the recorded engine data 304 to the offboard system 106 by the communication interface 216 based on the data management strategy.

Various data management strategies of the plurality of data management strategies may include one or more types of encryption (e.g., encryption rules) for different kinds of data such that what data content may be decrypted depends on the party receiving the data and which encryption key the party may possess. For example, a first encryption key may allow a first party to decrypt a portion of the recorded engine data 304 transmitted by the communication adapter 102 while a second encryption key may allow a second party to decrypt all of the recorded engine data 304 transmitted by the communication adapter 102. In various embodiments, the data management strategy for the determined location may include an encryption strategy and the processing circuitry 210 may be configured to encrypt the recorded engine data 304 with an encryption rule 310 of the encryption strategy. For example, in various embodiments, the first portion 306 of the recorded engine data 304 may be encrypted with the encryption rule 310 prior to transmitting the first portion 306 of the recorded engine data 304 to the offboard system 106.

In various embodiments, the processing circuitry 210 may be configured to direct the memory system 222 to selectively record the generated engine data 300 using a plurality of data streams. For example, memory system 222 may selectively record the generated engine data 300 as the data stream 302 and a second data stream 312 which is different than the data stream 302. In order to comply with multiple data storage, data sharing, and/or data encryption regulations, the plurality of data streams (e.g., the data streams 302, 312) may include different data content (e.g., different datasets, parameters, etc.) and/or may be encrypted using different encryption rules, based on the data management strategy for the determined location. For example, the processing circuitry 210 may be configured to encrypt recorded engine data 304 of the data stream 302 with the encryption rule 310 and to encrypt the recorded engine data 314 of the second data stream 312 with a second encryption rule 316 which is different than the encryption rule 310. The processing circuitry 210 may be configured to determine the data content of the data stream 302 and/or the second data stream 312 which may be transmitted to the offboard systems 106 based on the data management strategy for the determined location. For example, the data stream 302 may include the first portion 306 of the recorded engine data 304 which may be transmitted to the offboard system 106 based on data management strategy for the determined location.

The offboard system 106 may include a plurality of ground stations 124. In various embodiments, the processing circuitry 210 may be configured to direct the communication interface 216 to transmit recorded engine data 304 (e.g., the first portion 306 of the recorded engine data 304) to a particular ground station of the plurality of ground stations 124 based on the data management strategy for the determined location.

As previously discussed, data management strategies may be centrally managed and may be periodically uploaded to the communication adapter 102 from, for example, the offboard systems 106 or any other suitable communication system. In various embodiments, the processing circuitry 210 may be configured to direct the communication interface 216 to receive one or more updated data management strategies corresponding to a respective one or more locations. For example, the processing circuitry 210 may be configured to direct the communication interface 216 to receive an updated data management strategy, associated with the determined location, from the offboard system 106 and to direct the communication interface 216 to transmit the recorded engine data 300 in accordance with the updated data management strategy which may change one or more data recording, data transmittal, or data encryption rules associated with the determined location.

Figure 4:
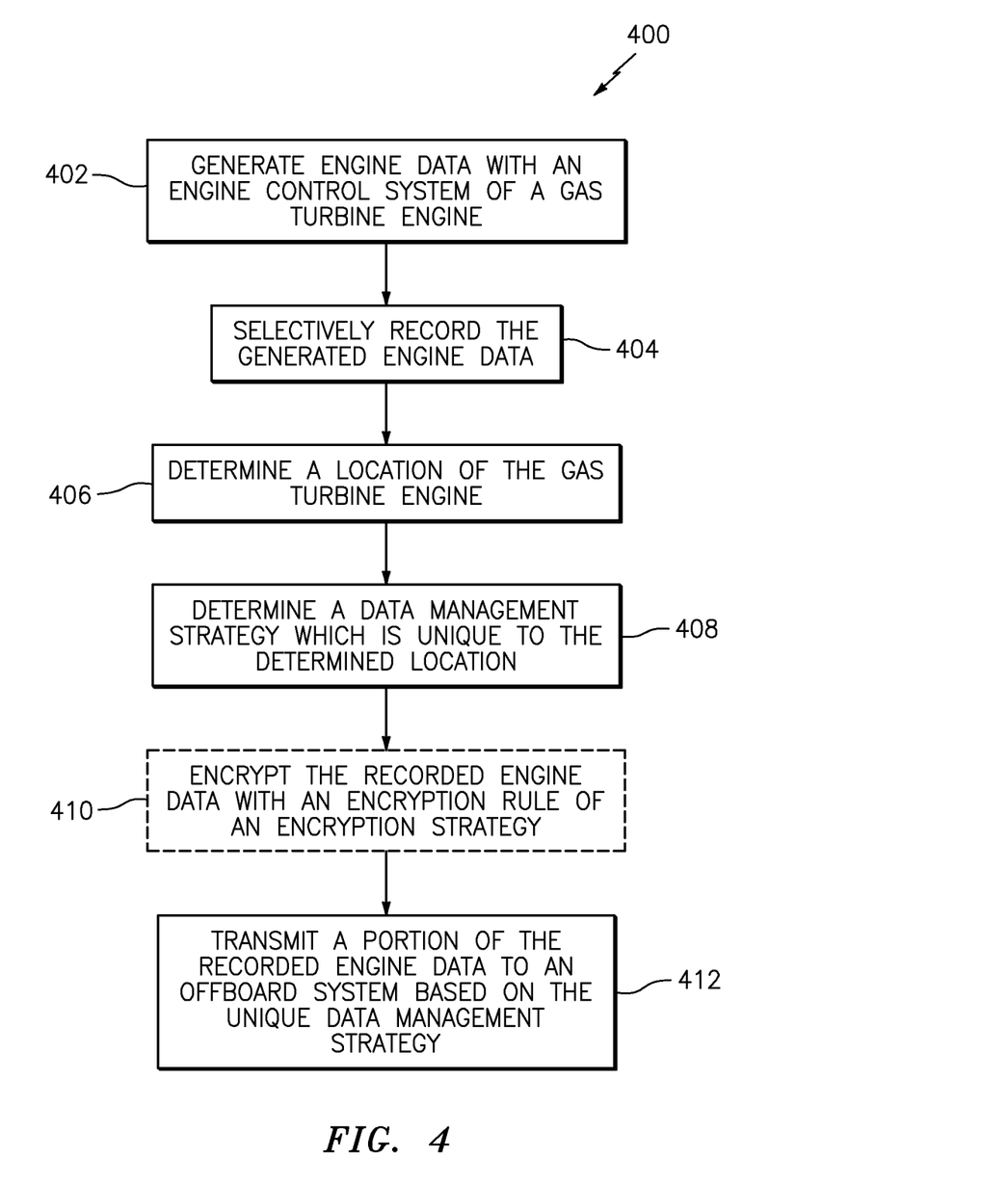
FIG. 4 illustrates a flowchart for a method for controlling communications between a gas turbine engine for an aircraft and an offboard system, in accordance with one or more embodiments of the present disclosure.

Referring now to FIG. 4 with continued reference to FIGS. 1, 2, and 3A-D, FIG. 4 is a flow chart illustrating a method 400 for controlling communications between a gas turbine engine 104 for an aircraft 108 and an offboard system 106. At Block 402, the engine control system 122 may generate engine data 300 associated with the configuration, operation, status, and/or other aspects of the gas turbine engine 104 or aircraft 108. At Block 404, the engine control system 122 and/or the communication adapter 102 may selectively record all or a portion of the generated engine data 300. At Block 406, the communication adapter 102 may determine a location of the gas turbine engine 104 using one or more methods including, but not limited to, determining a location using GPS, determining a location using wireless communication signals, and/or determining a location using known city pair combinations. At Block 408, the communication adapter 102 may determine a data management strategy based on the determined location which is unique to the determined location of the gas turbine engine 104. At Block 410, the communication adapter 102 may, optionally, encrypt the recorded engine data 304 using or more encryption rules 310, 316 of an encryption strategy for the data management strategy. In Block 412, the communication adapter 102 may transmit all or a portion of the recorded engine data 304 to an offboard system 106 based on the data management strategy.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A communication system of a gas turbine engine for an aircraft, the communication system comprising:
    an engine control system configured to generate engine data; and
    a communication device comprising:
        a memory system configured to store the generated engine data from the engine control system;
        a communication interface configured to wirelessly communicate with an offboard system external to the aircraft and to communicate with the engine control system and the memory system, the communication interface further configured to receive the generated engine data from the engine control system; and
        processing circuitry configured to:
            selectively record the generated engine data received by the communication interface to the memory system;
            determine a location of the gas turbine engine;
            determine a data management strategy based on the determined location; and
            disable transmission of the recorded engine data to the offboard system by the communication interface based on the data management strategy.

2. The communication system of claim 1, wherein the processing circuitry is configured to receive at least one of a GPS location, a cellular location, or a city pair location to determine the location of the gas turbine engine.

3. The communication system of claim 1, wherein the processing circuitry is configured to selectively record a portion of the generated engine data based on the data management strategy.

4. The communication system of claim 1, wherein the data management strategy comprises an encryption strategy and the processing circuitry is configured to encrypt the first portion of the recorded engine data with a first encryption rule of the encryption strategy.

5. The communication system of claim 4, wherein the processing circuitry is configured to selectively record the generated engine data to the memory system as a first data stream, including the first portion of the recorded engine data, and a second data stream which is different than the first data stream and wherein a data stream content of the first data stream and the second data stream is based on the data management strategy.

6. The communication system of claim 5, wherein the processing circuitry is configured to encrypt recorded engine data of the first data stream with the first encryption rule of the encryption strategy and to encrypt recorded engine data of the second data stream with a second encryption rule of the encryption strategy which is different than the first encryption rule.

7. The communication system of claim 1, wherein the offboard system includes a plurality of ground stations and wherein the processing circuitry is configured to direct the communication interface to transmit a first portion of the recorded engine data to a particular ground station of the plurality of ground stations based on the data management strategy.

8. The communication system of claim 7, wherein the processing circuitry is configured to direct the communication interface to receive an updated data management strategy, associated with the determined location, from the offboard system and to direct the communication interface to transmit a second portion of the recorded engine data to the offboard system, a second data content of the second portion of the recorded engine data based on the updated data management strategy.

9. The communication system of claim 1, wherein the engine control system comprises a plurality of sensors configured to capture state data associated with the gas turbine engine and wherein the engine data includes the state data.

10. A gas turbine engine for an aircraft, the gas turbine engine comprising:
    an engine control system configured to generate engine data, the engine control system comprising a plurality of sensors configured to capture state data associated with the gas turbine engine, the engine data including at least a portion of the state data; and
    a communication device comprising:
        a memory system configured to store the generated engine data from the engine control system;
        a communication interface configured to wirelessly communicate with an offboard system external to the aircraft and to communicate with the engine control system and the memory system, the communication interface further configured to receive the generated engine data from the engine control system; and processing circuitry configured to:
- selectively record the generated engine data received by the communication interface to the memory system as a first data stream and a second data stream which is different than the first data stream, a data stream content of the first data stream and the second data stream based on a data management strategy, the first data stream including a first portion of the recorded engine data;
- determine a location of the gas turbine engine;
- determine the data management strategy based on the determined location, the data management strategy comprising an encryption strategy, the encryption strategy including a first encryption rule and a second encryption rule which is different than the first encryption rule;
- encrypt recorded engine data of the first data stream with the first encryption rule and encrypt recorded engine data of the second data stream with the second encryption rule; and
- direct the communication interface to transmit the first portion of the recorded engine data to the offboard system, a data content of the first portion of the recorded engine data based on the data management strategy.

11. A method for controlling communications between a gas turbine engine for an aircraft and an offboard system, the method comprising:
- generating engine data with an engine control system;
- selectively recording the generated engine data;
- determining a location of the gas turbine engine;
- determining a data management strategy based on the determined location; and
- transmitting a first portion of the recorded engine data to the offboard system, a data content of the first portion of the recorded engine data based on the data management strategy; and
- disabling transmission of at least a portion of the recorded engine data to the offboard system based on the data management strategy.

12. The method of claim 11, wherein determining the location of the gas turbine engine comprises receiving at least one of a GPS location, a cellular location, or a city pair location.

13. The method of claim 11, wherein selectively recording the generated engine data comprises selectively recording a portion of the generated engine data based on the data management strategy.

14. The method of claim 11, wherein the data management strategy comprises an encryption strategy, the method further comprising encrypting the first portion of the recorded engine data with a first encryption rule of the encryption strategy.

15. The method of claim 14, wherein selectively recording the generated engine data comprises selectively recording the generated engine data as a first data stream, including the first portion of the recorded engine data, and a second data stream different than the first data steam and wherein a data stream content of the first data stream and the second data stream is based on the data management strategy.

16. The method of claim 15, wherein encrypting the recorded engine data further comprises encrypting recorded engine data of the first data stream with the first encryption rule of the encryption strategy and encrypting recorded engine data of the second data stream with a second encryption rule of the encryption strategy which is different than the first encryption rule.

17. The method of claim 11, wherein the offboard system includes a plurality of ground stations and wherein transmitting the first portion of the recorded engine data to the offboard system comprises transmitting the first portion of the recorded engine data to a particular ground station of the plurality of ground stations based on the data management strategy.

18. The method of claim 11, further comprising receiving an updated data management strategy, associated with the determined location, from the offboard system.

* * * * *